United States Patent
Khitrov

(10) Patent No.: US 7,817,683 B2
(45) Date of Patent: Oct. 19, 2010

(54) PULSED LINEARLY POLARIZED OPTICAL FIBER LASER USING UNPOLARIZED Q-SWITCHED SEED LASER AND HAVING GOOD OUTPUT POWER STABILITY

(75) Inventor: Victor Khitrov, South Windsor, CT (US)

(73) Assignee: NUFERN, East Granby, CT (US)

( * ) Notice: Subject to any disclaimer, the term of this patent is extended or adjusted under 35 U.S.C. 154(b) by 81 days.

(21) Appl. No.: 12/358,012

(22) Filed: Jan. 22, 2009

(65) Prior Publication Data

US 2009/0262761 A1 Oct. 22, 2009

Related U.S. Application Data

(60) Provisional application No. 61/022,812, filed on Jan. 22, 2008.

(51) Int. Cl.
*H01S 3/30* (2006.01)
(52) U.S. Cl. ............................................. 372/6; 372/39
(58) Field of Classification Search ............ 372/29.014, 372/39, 6, 22; 385/126
See application file for complete search history.

(56) References Cited

U.S. PATENT DOCUMENTS

| | | | |
|---|---|---|---|
| 5,909,306 A * | 6/1999 | Goldberg et al. | 359/337.1 |
| 6,275,250 B1 * | 8/2001 | Sanders et al. | 347/247 |
| 6,917,631 B2 * | 7/2005 | Richardson et al. | 372/5 |
| 7,330,301 B2 * | 2/2008 | Harter | 359/333 |
| 7,529,281 B2 * | 5/2009 | Leonardo et al. | 372/22 |

* cited by examiner

*Primary Examiner*—Minsun Harvey
*Assistant Examiner*—Tuan N. Nguyen
(74) *Attorney, Agent, or Firm*—Peter J. Rainville

(57) ABSTRACT

Optical fiber source for providing polarized optical pulses, comprising a Q-switched fiber laser for providing substantially unpolarized seed pulses of optical energy, where the Q-switched fiber laser can comprise a laser cavity having a Q-switch and an optical fiber comprising a gain medium, where the optical fiber need not be a polarizing or polarization maintaining optical fiber; a passive polarizing element arranged to receive and substantially polarize the substantially unpolarized seed pulses; and a polarization maintaining fiber amplifier arranged for receiving the polarized seed pulses. The polarization maintaining fiber amplifier can comprise a selected polarizing or polarization maintaining fiber having a core comprising a gain medium for amplifying the substantially polarized seed pulses, where the core can be normally multimode at a an operating wavelength of the optical fiber source. The fiber amplifier can provide substantially polarized output pulses. In one practice of the invention, the pulse power instability, over at least 100 consecutive pulses, is no greater than 10%.

17 Claims, 3 Drawing Sheets

Q-switch fiber laser and pulsed fiber amplifier design

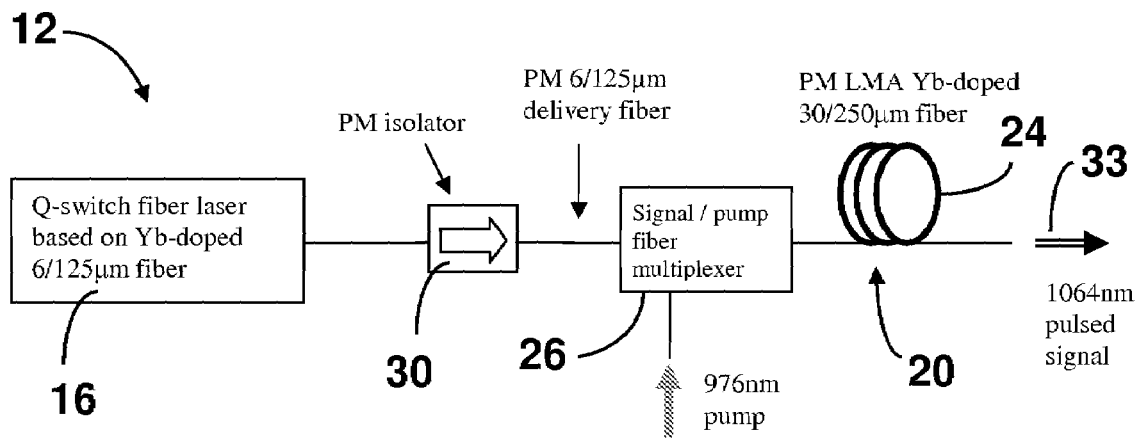
Figure 1 - Q-switch fiber laser and pulsed fiber amplifier design
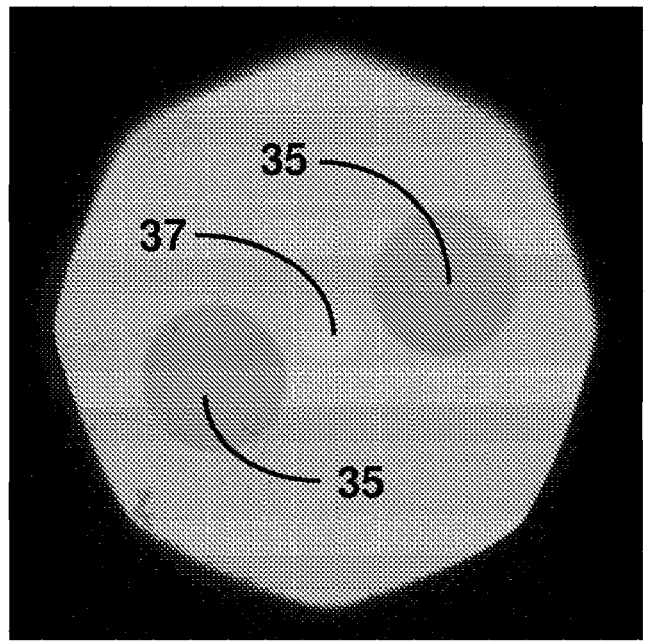
Figure 2 - Microscope image of fiber cross section

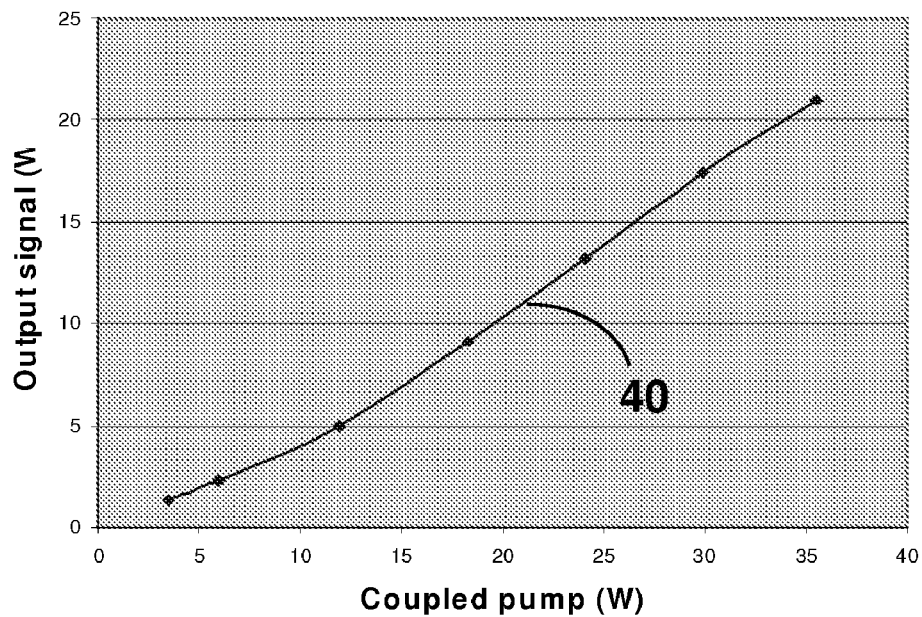
Figure 3 – Laser efficiency
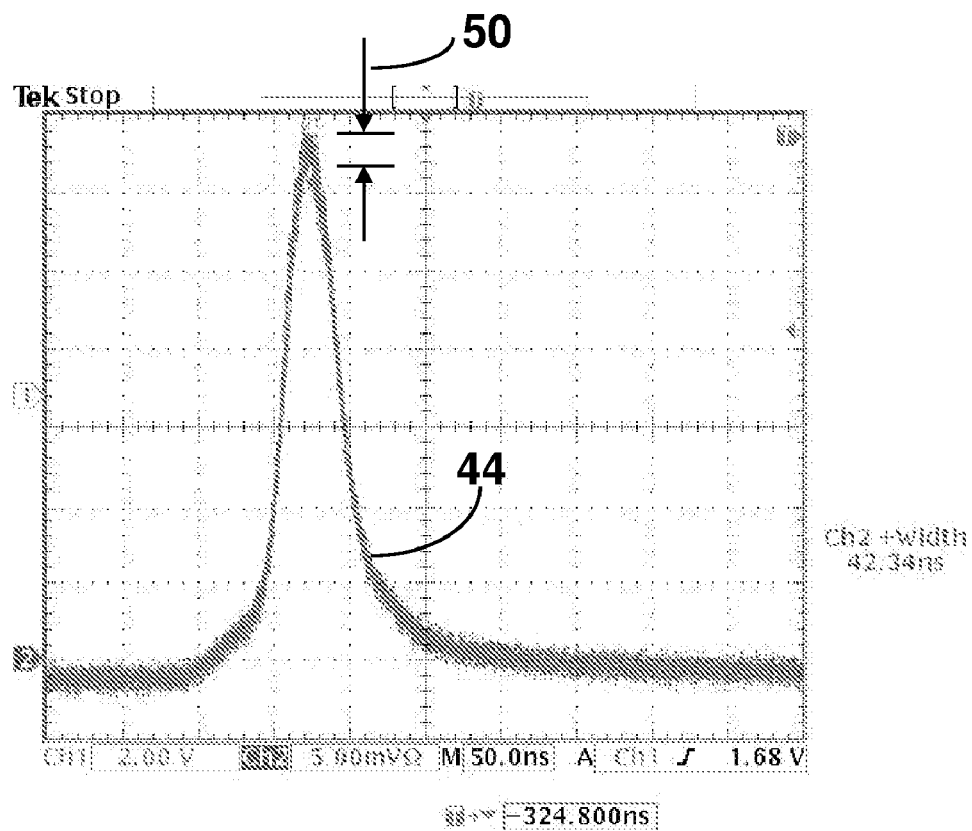
Figure 4 – Laser output pulse shape

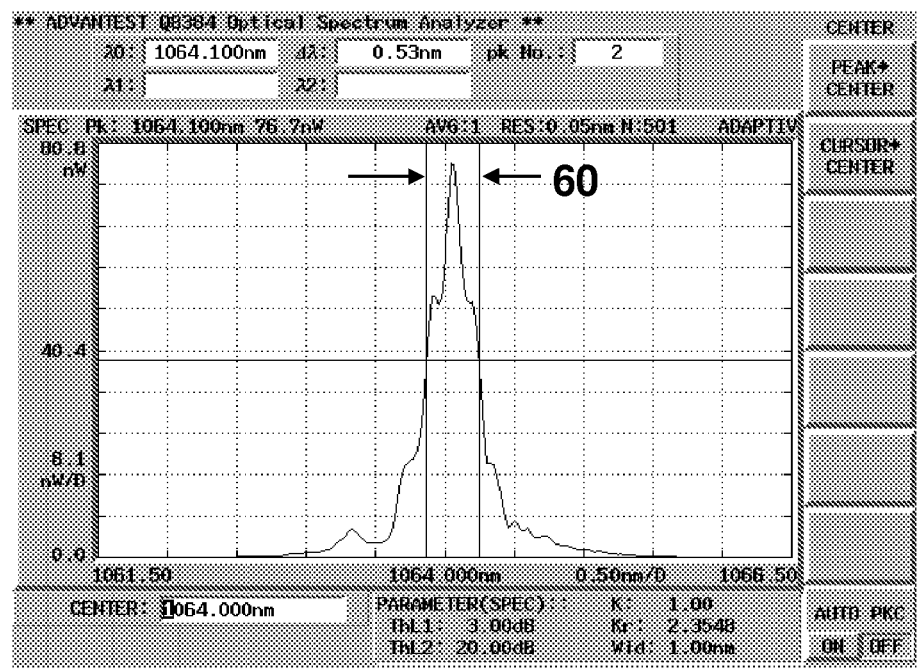
Figure 5 – Laser output spectrum
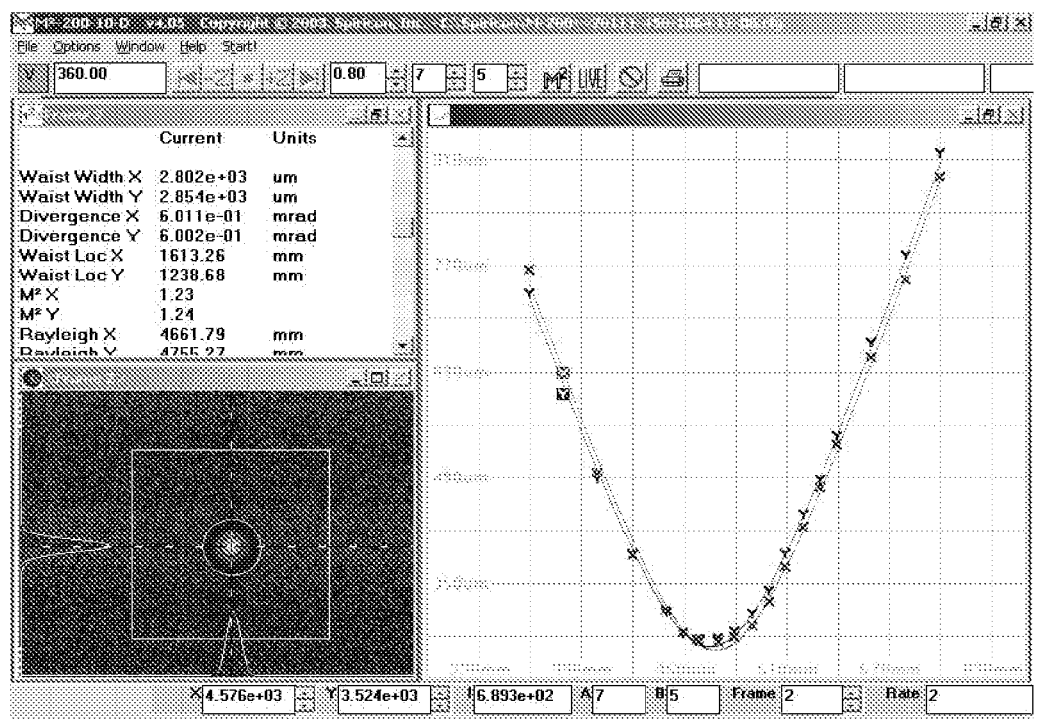
Figure 6 – Output beam quality measurement

PULSED LINEARLY POLARIZED OPTICAL FIBER LASER USING UNPOLARIZED Q-SWITCHED SEED LASER AND HAVING GOOD OUTPUT POWER STABILITY

CROSS-REFERENCE TO RELATED APPLICATION

This application claims priority to U.S. Provisional Patent Application No. 61/022,812, filed Jan. 22, 2008 and entitled "Pulsed Linearly Polarized Optical Fiber Laser Using Unpolarized Q-Switched Seed Laser and Having Good Output Power Stability", and which is herein incorporated by reference.

FIELD OF THE INVENTION

The present invention relates to fiber based optical apparatus for providing high power, polarized output pulses with good pulse-to-pulse stability and that can comprise, for example, a completely monolithic linearly polarized pulsed fiber amplifier seeded by a Q-switched fiber laser oscillator.

BACKGROUND

Pulsed substantially single-mode fiber lasers emitting multiple kW peak powers with average powers in the 10-20 W range are ideal laser sources for many of today's applications in material processing such as, for example, marking and engraving. Such fiber-based devices have numerous advantages over other types of lasers, such as flexible pulse durations/repetition rates, compact air cooled platforms due to the high efficiency operation, and maintenance-free operation. There is a particular interest in linearly polarized single-mode pulsed fiber devices with a similar set of generic specifications. Non-polarized single-mode pulsed fiber lasers in the 10-20 W average power regime have been successfully demonstrated. See, for example, A. Piper, A. Malinowski, K. Furusawa, D. J. Richardson "1.2 mJ, 37 ns single-moded pulses at 10 kHz repetition rate from a Q-switched ytterbium fiber laser" in CLEO proceedings, CMK3, San-Francisco, Calif., USA, 2004).

However, developing high-power linearly polarized single-mode pulsed devices can be challenging due to management of the fiber non-linearities, coupled with polarization control in the large mode area (LMA) fibers often used to generate high peak powers. In addition, producing pulses at 10-20 kW peak powers with spectrally narrow linewidth, which can be very useful for efficient conversion to visible and UV wavelengths through frequency doubling/tripling can be very challenging. See, for example, C. Ye, M. Gong, P. Yan, Q. Liu and G. Chen, "Linearly-polarized single-transverse-mode high-energy multi-ten nanosecond fiber amplifier with 50 W average power", Optics Express, 14, 17, 7604, (2006).

Certain methods are known from the literature based on seeded fiber amplifiers. See, for example, the above noted paper by Ye et al., where the seed source is a diode pumped solid state laser (DPSSL). As another example, see F. Di Teodoro, J. P. Koplow, S. W. Moore, D. A. V. Kliner, "Diffraction-limited, 300-kW peak-power pulses from a coiled multimode fiber amplifier, Optics Letters, 27, 7, 518, (2002), where the seed source comprises a passively Q-switched microchip laser. Another approach is based on diode sources. See, for example, D. Creeden, J. McCarthy, R. Day, P. Ketteridge, E. Chicklis, "Near diffraction-limited, 1064 nm, all-fiber master oscillator fiber amplifier (MOFA) with enhanced SRS suppression for pulsed nanosecond applications", SSDLTR Technical Digest 2006, Paper FIBER 1-4. See also W. Torruellas, Y. Chen, B. McIntosh, J. Farroni, K. Tankala, S. Webster, D. Hagan, M. Soileau, M. Messerly, J. Dawson, "High peak power Yb-doped fiber amplifiers", *Fiber Lasers III: Technology, Systems, and Applications*, Proc. SPIE Vol. 6102, 61020N (2006). Other approaches are based on CW fiber lasers that are subsequently modulated, such as disclosed in A. Liu, M. Noesen and R. Mead, "60 W green output by frequency doubling of a polarized Yb-doped fiber laser", Optics Letters, 30, 1, 76, (2005). These approaches, however, can suffer from the need to fiber couple the output from the solid state laser into the fiber power amplifier stage. The foregoing approaches also usually deliver low peak power from the seed laser and subsequently require multiple (two or three) fiber amplifier stages to generate the ~20 kW peak power targeted for these applications.

It is an object of the present invention to address one or more of the drawbacks and disadvantages of the prior art.

SUMMARY OF THE INVENTION

In one aspect, the invention provides an optical fiber source for providing an optical energy output comprising polarized output optical pulses, such as, for example, linearly polarized output pulses. The optical fiber source can comprise a Q-switched fiber laser for providing substantially unpolarized seed pulses of optical energy, where the Q-switched fiber laser comprises a laser cavity having a Q-switch and a length of optical fiber comprising a gain medium, the length of optical fiber not being a polarizing or polarization maintaining (PM) optical fiber; a passive polarizing element arranged to receive and substantially polarize the substantially unpolarized seed pulses, the passive polarizing element having an insertion loss of at least 2 dB when considering total incident power in the input unpolarized seed pulses and total output power in the substantially polarized pulses exiting the passive polarizing element; and a polarization maintaining fiber amplifier arranged for receiving the polarized seed pulses, the polarization maintaining fiber amplifier comprising a selected length of polarizing or polarization maintaining fiber having a core comprising a gain medium for amplifying the substantially polarized seed pulses, where the core can be normally multimode at a fundamental wavelength comprised by the substantially polarized seed pulses. The optical fiber laser source can provide substantially polarized output pulses. In one practice of the invention, the pulse power instability, over at least 100 consecutive pulses, is no greater than 10%.

In another aspect, the invention can provide an optical fiber source for providing output optical energy comprising polarized optical pulses. The optical fiber source can comprise a Q-switched fiber laser for providing substantially unpolarized seed pulses of optical energy, where the Q-switched fiber laser comprises a laser cavity having a Q-switch and a length of optical fiber comprising a gain medium, the length of optical fiber not being a polarizing or polarization maintaining optical fiber. The optical fiber source can also include a passive polarizing element arranged to receive and substantially polarize the substantially unpolarized seed pulses, where the passive polarizing element has an insertion loss of at least 2 dB when considering the total incident power in the received, substantially unpolarized seed pulses provided as input to the passive polarizing element and the power of the substantially polarized pulses outputted from the passive polarizing element.

The optical fiber laser source can further comprise a polarization maintaining optical fiber amplifier arranged for receiving the substantially polarized seed pulses, where the polarization maintaining optical fiber amplifier comprises a selected optical fiber having a core comprising a gain medium for amplifying said substantially polarized seed pulses. The selected optical fiber can have an inner cladding disposed about the core, and the core can be normally multimode at the operating wavelength of the optical fiber laser source. The core of the selected optical fiber can have a first numerical aperture and the inner cladding can have a second numerical aperture that is greater than the first numerical aperture. The selected optical fiber can be birefringent as well as a polarization maintaining or polarizing optical fiber. The polarization maintaining fiber amplifier can provide output optical energy comprising substantially polarized output pulses, and the optical fiber laser source can comprise at least one of the selected optical fiber being coiled so as to provide mode selectivity by inducing bend loss for higher order modes or a mode field adapter adapting a mode field to the mode field of the selected optical fiber. The output optical energy can have an output beam quality comprising a $M^2$ factor of no greater than 2.5 and the output optical energy can a pulse power instability, measured over at least 100 consecutive pulses, that is no greater than 10%.

The peak power of the substantially polarized output pulses can be at least 5 kW, at least 10 kW, at east 15 kW, at least 18 kW, or at least 20 kW. The duration of the output pulses can range anywhere, for example, from 40 ns to 200 ns, with the pulse repetition frequency ranging, for example, from 20 kHz to 200 kHz. The substantially polarized output pulses can have a polarization extinction ratio of at least 10 dB, at least 12 dB, or at least 15 dB.

In certain practices of the invention, the power instability can be no greater than 10%, no greater than 7.5%, or no greater than 5%. The low power instability can be maintained over at least 200, at least 300, at least 500, at least 800, or at least 1000 pulses. The output beam of the fiber laser can have an $M^2$ of no greater than 2.5, no greater than 2, no greater than 1.5, or no greater than 1.2. The gain of the PM amplifier can be at least 8 dB, at least 10 dB, at least 12 dB, or at least 15 dB. A length of polarizing fiber can be used as the polarizing element, and the PM optical fiber amplifier can comprise PM fiber coiled to provide polarizing behavior, as taught in WO 2005/074573 (PCT/US05/02908).

Monolithic, as used herein, means that an optical laser apparatus is substantially free of "free space" transmission of optical energy, meaning that all components are fiber based and/or fiber pigtailed, such that any free space transmission is within a sealed component and not between components.

"Substantially unpolarized," as used herein, means having a Polarization Extinction Ratio (PER) of less than 2 dB. In some instances, the Q-switch seed laser can provide seed pulses having a PER of less than 1 dB, or less than 0.5 dB, or that is substantially 0 dB.

BRIEF DESCRIPTION OF THE DRAWINGS

FIG. 1 schematically illustrates one embodiment of an optical fiber laser source for providing polarized pulses according to the present invention;

FIG. 2 is a microscope image of a cross section of the polarization maintaining fiber of the PM amplifier of the optical fiber laser of FIG. 1;

FIG. 3 shows a graph of slope efficiency of the optical fiber laser source of FIG. 1.

FIG. 4 shows a graph of representative laser output pulse shape and stability for the optical fiber laser source of FIG. 1;

FIG. 5 shows an output spectrum representative of the output pulses from the optical fiber laser source of FIG. 1; and FIG. 6 shows a measurement of output beam quality representative of the output from the optical fiber laser source of FIG. 1.

DETAILED DESCRIPTION

FIG. 1 schematically illustrates one embodiment of an optical fiber laser source 12 for providing linearly polarized pulses according to the present invention. The optical fiber laser source 12 can comprise a low power acousto-optical modulator (AOM) based Q-switched fiber laser 16 and a single, higher power polarization maintaining (PM) fiber amplifier stage 20. (Though a single amplifier stage is shown in FIG. 1, multiple stages are within the scope of the invention). As indicated by reference numeral 33 of FIG. 1, the optical fiber laser source 12 can provide pulsed output optical energy at a wavelength of operation of, for example, 1064 nm. Because of the fairly high average power from the Q-switched fiber laser 16 (typically ~300 mW), the simple master oscillator—power amplifier (MOPA) architecture shown in FIG. 1 can require fewer amplifier stages (e.g., only one) than fiber lasers designed around, for example, diode lasers as the seed source. Applicant understands that typically those schemes would require 2 or 3 amplifier stages to deliver the targeted ~20 kW peak power (see, for example, the Torruellas et al. and Liu et al. papers cited above). Other schemes using Q-switched solid state lasers can achieve this peak power and higher in a single stage, but usually involve free space coupling of the seed laser to the power amplifier, which is undesirable.

As shown in FIG. 1, the PM amplifier 20 can comprise a length of coiled Yb-doped PM LMA 30/250 μm optical fiber 24 and a signal/pump fiber multiplexer 26 arranged in a co-pumped configuration. The 3 m length 24 of Yb-doped fiber 24 can provide about 10 dB of pump absorption, coiled onto an 8 cm diameter mandrel to use the "coiling technique" to maintain good beam quality, as taught by U.S. Pat. No. 6,496,301. See also J. P. Koplow, D. A. V. Kliner and L. Goldberg, "Single-mode operation of a coiled multimode fiber amplifier", Optics Letters, 25, 7, 442 (2000). The fiber multiplexer 26 couples seed pulses from the Q-switched fiber laser 16, which are first polarized by the PM isolator 30, and pump light having a wavelength of 976 nm, into the length of Yb-doped 30/250 μm optical fiber 24 of the PM amplifier 20. The input signal port of the optical fiber multiplexer 26 can comprise a standard single-mode PM 6/125 μm fiber (see the "delivery fiber" of FIG. 1) and the pump port for receiving the 976 nm light can comprise a multimode 200/220 μm 0.2 NA fiber. The pump light can be provided by a fiber coupled 976 nm diode bar (~40 W) pump source and can have a linewidth of approximately 3 nm at "full width half maximum" (FWHM). A mode field adapter, not shown in FIG. 1, can be interposed between the multiplexer 26 and the PM fiber amplifier 20 to match the mode field diameter of the output fiber of the multiplexer 26, which can also be 6/125 fiber (in this designation the first number, in microns, refers to the diameter of the core and the second, again in microns, to the diameter of the cladding) to the mode field diameter of the 30/250 fiber of the PM optical fiber amplifier 20.

The Q-switched seed laser 16 can be based on non-polarization maintaining Yb-doped 6/125 μm fiber, can be free of intra cavity polarizing components and can provide substantially unpolarized seed pulses. The Q-switched fiber laser 16 can be operated at 300 mW output power. The output from the Q-switched fiber laser 16 can be coupled into the PM fiber amplifier 20 through a commercially available fiber coupled PM isolator 30, which can polarize the seed pulses by, for example, passing only one polarization. This is a simple, but lossy technique, as power from the Q-switch optical fiber laser 16 in the polarization that is not passed is simply lost. Other polarizing elements, known to those of ordinary skill in the art, can be used to polarize the seed pulses (e.g., a polarizing beam splitter).

FIG. 2 illustrates a cross section of the fiber 24 of FIG. 1. The panda-type PM-LMA, Yb-doped optical fiber (YDF) 24 comprised by the PM amplifier 20 can be particularly useful in helping to achieve high laser powers. The optical fiber 24 can have a 30 μm diameter core doped with ytterbium, a 250 micron octagonally-shaped inner cladding, a 0.06 core numerical aperture (NA) and a 0.46 cladding NA. The optical fiber 24 can include two borosilicate stress rods 35 disposed about the core 37 to induce birefringence and provide PM behavior. The birefringence of this structure is as high as $2.5 \times 10^{-4}$.

The optical fiber 24 can be inherently, or normally, multi-mode, meaning that it is capable of supporting a number of transverse modes at the wavelength of operation (e.g., 1064 nm) of the optical fiber laser source 12 when, for example, substantially linearly oriented. The coiling technique, noted above, can be used to obtain substantially single-mode linearly polarized operation. Coiling can induce a bend loss for higher order modes while allowing the fundamental linearly polarized mode to propagate with no substantial passive loss (<0.01 dB/m). See, for example, U. Manyam, B. Samson, V. Khitrov, D. Machewirth, J. Abramczyk, N. Jacobson, J. Farroni, D. Guertin, A. Carter and K. Tankala, "Laser fibers designed for single polarization output" in Advanced Solid-State Photonics Technical Digest MA6, Santa Fe, NM, USA, 2004.

The output power from the Q-switch laser 16 can be ~300 mW (average power), corresponding to peak powers of ~400 W. At those power levels the reliability of the components are acceptable for industrial laser applications. Applicant considers that this can be a major advantage of the MOPA design of FIG. 1, where the oscillator (i.e., laser) power is kept relatively low. The pulse repetition rate from the Q-switched fiber laser 16 can be varied between ~10 kHz and >100 kHz, typically. Many results presented herein were collected at a fixed rep rate of 20 kHz. The pulses from the Q-switched fiber laser 16 were amplified in the PM amplifier stage 20 after the mid-stage PM fiber isolator 30.

FIG. 3 shows the amplified 1064 nm signal output optical energy 33 vs coupled pump power. 21 W average output is achieved at highest available coupled pump power (35 W). Overall amplifier optical efficiency was 60%. A PER of 17 dB was measured at the output of the PM amplifier 24.

FIG. 4 shows the output pulse shape 44 of the output optical energy 33. Pulse duration was 42 ns at 20 kHz repetition rate, which is fairly typical for this Q-switch fiber laser. Pulse energy is at ~1 mJ corresponding to a peak power of ~20 kW. Note that the instability 50, indicated by the "hash" in curve 44, where the curve represents a measurement over hundreds of pulses, is surprisingly low, especially in consideration of the fact that the Q-switch seed laser provides substantially unpolarized seed pulses. For example, as can be ascertained from FIG. 4, the "hash" represents an instability 50 that is least as good (e.g., low) as being not greater than 7.5%, meaning that variation represented by the "hash" is not greater than a 7.5% variation in the peak of the curve 44. The Q-switch seed laser 16 typically comprises a laser cavity formed with non-PM or polarizing fiber having a gain media, a pair of fiber Bragg gratings (FBGs), and a non-PM commercially available AOM. This saves considerable expense over a PM fiber and components based Q-switch seed laser, and yet, to Applicant's surprise, yielded very good results in terms of peak power, power stability, and PER.

FIG. 5 shows the measured laser output spectrum of the output optical energy 33. As indicated by reference numeral 60, the optical fiber laser source 12 had a relatively narrow linewidth (0.53 nm), determined by the spectrum of the FBG used in the oscillator and is measured at ~1 mJ pulse energy/20 kHz rep rate. This linewidth would be acceptable for frequency doubling the fiber laser to the green or UV using standard non-linear crystals. Furthermore, because of the broad nature of the Yb-gain spectrum it is considered that the optical fiber laser source 12 can be readily tuned to another wavelength simply by changing the operating wavelength of the FBGs in the Q-switched fiber laser 16. In particular, operating such a pulsed system at shorter wavelengths around 1030 nm would be interesting, opening up UV wavelengths that may otherwise be difficult to access.

FIG. 6 shows a beam quality measurement of the output optical energy 33. The optical fiber laser source 12 produced a near diffraction limited beam. $M^2$ was measured as 1.2 from the PM amplifier stage 20. It is noted the 30/250 μm fiber used with the PM amplifier stage here is also suitable for amplifying other types of lasers operating at very different repetition rates/pulse durations to that demonstrated here and indeed is capable of generating >1 MW powers. See, for example, R. L. Farrow, D. A. V. Kliner et al, "High-peak-power (>1.2 MW) pulsed fiber amplifier" in Fiber Lasers III. Technology, Systems, and Applications, Proc. SPIE Vol. 6102, 61020L (2006).

The flexibility and reliability of operating the optical fiber laser source 12 of the present invention with a fiber based Q-switched seed oscillator 16 is very attractive for applications where pulse durations of ~40 nsec and peak powers in the 10's of kWatts are acceptable. The adaptation of these all-fiber Q-switched MOPA systems to a PM-design delivering a narrow spectral linewidth, good PER and excellent beam quality provides useful IR sources for efficient frequency conversion to green and UV wavelengths.

The architecture of the optical apparatus 12 shown in FIG. 1, which uses a single low power Q-switched non-PM fiber seed laser, is much simpler than an apparatus that uses a PM laser, such as a PM seed laser, and can provide significant benefits over an optical apparatus using a PM seed laser. A PM seed laser can require a PM fiber based laser cavity, as well as a PM AOM, or even active PM control schemes, together with a PM power amplifier stage. The architecture of FIG. 1 can allow a range of pulse durations and repetition rates that would be difficult to achieve if a single stage Q-switched oscillator were to be designed to deliver the same power/pulse energy. Furthermore the reliability of key components in the Q-switched oscillator is improved at the lower operating power.

Thus in one embodiment the invention can include a completely monolithic linearly-polarized pulsed fiber amplifier seeded by a substantially unpolarized Q-switched fiber laser oscillator. This simple MOPA design can provide near diffraction limited beam quality with ~20 kW peak power (1 mJ pulse energy, ~45 nsec) pulses and an average power ~20 W at 20 kHz repetition rate with linearly polarized (>17 dB PER) output. Spectrally narrow pulses with ~0.5 nm linewidth centered at 1064 nm, suitable for various non-linear applications including generation of visible and UV light, can be produced. The monolithic fiber amplifier can include a coil of polarization maintaining large mode area (PM-LMA) fiber with 30 μm core, and the Q-switched fiber oscillator that seeds the amplifier can be of relatively low power output. Good output beam quality is achieved through the mode selectivity of the coiled PM-LMA fiber in the amplifier stage. Such compact and robust fiber lasers are suitable for a variety of applications, such as nonlinear wavelength conversion processes using a variety of nonlinear materials, laser radars, etc.

Several embodiments of the invention have been described and illustrated herein. Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used. It is therefore to be understood that the foregoing embodiments are presented by way of example only and that within the scope of the appended claims and equivalents thereto, the invention may be practiced otherwise than as specifically described.

In the claims as well as in the specification above, all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision 1.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

Having described the invention, what is claimed as new and to be secured by Letters Patent is:

1. An optical fiber laser source for providing output optical energy at an operating wavelength, the output optical energy including polarized optical pulses, comprising:
    a Q-switched fiber laser for providing substantially unpolarized seed pulses of optical energy, said Q-switched fiber laser comprising a laser cavity having a Q-switch and a length of optical fiber comprising a gain medium, said length of optical fiber not being a polarizing or polarization maintaining optical fiber;
    a passive polarizing element arranged to receive and substantially polarize said substantially unpolarized seed pulses, said passive polarizing element having an insertion loss of at least 2 dB when considering the total incident power in the received, substantially unpolarized seed pulses provided as input to the passive polarizing element and the power of the substantially polarized pulses outputted from the passive polarizing element;
    a polarization maintaining optical fiber amplifier arranged for receiving said substantially polarized seed pulses, said polarization maintaining fiber amplifier comprising a selected optical fiber having a core comprising a gain medium for amplifying said substantially polarized seed pulses;
    said selected optical fiber having an inner cladding disposed about said core, said core being normally multimode at the operating wavelength of the optical fiber laser source;
    said core of said selected optical fiber having a first numerical aperture and said inner cladding having a second numerical aperture that is greater than said first numerical aperture;
    said selected optical fiber being birefringent as well as polarization maintaining or polarizing optical fiber;
    wherein said polarization maintaining fiber amplifier provides output optical energy comprising substantially polarized output pulses;
    wherein said optical fiber laser source comprises at least one of said selected optical fiber being coiled so as to provide mode selectivity by inducing bend loss for higher order modes or a mode field adapter adapting a mode field to the mode field of said selected optical fiber, said output optical energy having an output beam quality comprising a $M^2$ factor of no greater than 2.5; and
    wherein said output optical energy has a pulse power instability, measured over at least 100 consecutive pulses, of no greater than 10%.

2. The optical fiber laser source of claim 1 wherein said pulse power instability is no greater than 7.5%.

3. The optical fiber laser source of claim 1 wherein said pulse power instability is no greater than 5%.

4. The optical fiber laser source of claim 1 wherein said selected optical fiber is coiled so as to provide mode selectivity by inducing bend loss for higher order modes.

5. The optical fiber laser source of claim 1 wherein said optical fiber laser source comprises a mode field adapter adapting a mode field to the mode field of said selected optical fiber.

6. The optical fiber laser source of claim 1 wherein said optical fiber laser source comprises both of said selected optical fiber being coiled so as to provide mode selectivity by inducing bend loss for higher order modes and a mode field adapter adapting a mode field to the mode field of said selected optical fiber.

7. The optical fiber laser source of claim 1 wherein said pulse power instability is measured over at least 500 consecutive pulses.

8. The optical fiber laser source of claim 1 wherein said $M^2$ factor is no greater than 2.0.

9. The optical fiber laser source of claim 1 wherein said $M^2$ factor is no greater than 1.5.

10. The optical fiber laser source of claim 1 wherein said substantially polarized output pulses comprise a peak power of at least 18 kW.

11. The optical fiber laser source of claim 1 wherein said substantially polarized output pulses comprise a peak power of at least 20 kW.

12. The optical fiber laser source of claim 1 wherein said polarizing element comprises a polarizing beam splitter.

13. The optical fiber laser source of claim 1 wherein the optical fiber source does not include another polarization maintaining amplifier.

14. The optical fiber laser source of claim 1 wherein said substantially unpolarized seed pulses of the Q-switched fiber laser have a polarization extinction ratio of less than 1 dB.

15. The optical fiber laser source of claim 1 wherein said substantially unpolarized seed pulses of the Q-switched fiber laser have a polarization extinction ratio of substantially 0 dB.

16. The optical fiber laser source of claim 1 wherein said substantially polarized output pulses have a peak power of at least 15 kW.

17. The optical fiber laser source of claim 1 wherein said substantially polarized output pulses have a polarization extinction ratio of at least 12 dB.

* * * * *